United States Patent [19]
Morita et al.

[11] Patent Number: 5,202,980
[45] Date of Patent: Apr. 13, 1993

[54] INFORMATION PROCESSING SYSTEM CAPABLE OF READILY TAKING OVER PROCESSING OF A FAULTY PROCESSOR

[75] Inventors: Nobuki Morita, Tokyo; Shinichi Nomiyama, Ehime; Kazuhito Koguchi; Yoshiaki Sugiyama, both of Tokyo, all of Japan

[73] Assignee: NEC Corporation, Tokyo, Japan

[21] Appl. No.: 547,005

[22] Filed: Jul. 2, 1990

[30] Foreign Application Priority Data

Jun. 30, 1989 [JP] Japan .................. 1-166924
Jul. 14, 1989 [JP] Japan .................. 1-180516
Nov. 30, 1989 [JP] Japan .................. 1-309272

[51] Int. Cl.$^5$ ................................. G06F 11/00
[52] U.S. Cl. ........................ 395/575; 371/9.1; 371/8.1
[58] Field of Search .......... 364/200; 371/68.1, 7, 371/9., 11.2; 395/575, 200, 325

[56] References Cited

U.S. PATENT DOCUMENTS

| | | | |
|---|---|---|---|
| 4,228,496 | 10/1980 | Katzman et al. | 364/200 |
| 4,412,280 | 10/1983 | Murphy et al. | 364/200 |
| 4,412,281 | 10/1983 | Works | 364/200 |
| 4,590,554 | 5/1986 | Glazer et al. | 364/200 |
| 4,616,310 | 10/1986 | Dill et al. | 364/200 |
| 4,646,300 | 2/1987 | Goodman et al. | 371/33 |
| 4,744,023 | 5/1988 | Welsch | 364/200 |
| 4,975,838 | 12/1990 | Mizuno et al. | 364/200 |
| 5,003,538 | 3/1991 | Lee et al. | 371/32 |

FOREIGN PATENT DOCUMENTS

55-102064 4/1980 Japan .

*Primary Examiner*—Robert W. Beausoliel, Jr.
*Assistant Examiner*—Ly V. Hua
*Attorney, Agent, or Firm*—Sughrue, Mion, Zinn, Macpeak & Seas

[57] ABSTRACT

In an information processing system comprising a plurality of processor units each of which comprises a memory unit, an execution processor, an information transfer unit, and a bus line connected to one another, the memory unit has a control information area and a data area for storing a control information signal and a main data signal, respectively, and a saving area for saving the main data signal which is stored as a copied signal of the data signal. When the copied signal is saved into the saving area, an information transfer unit receives, through the bus line, the main data signal which is read out of the memory unit and which is transferred to the other processor unit. An additional data signal is produced by the other processor unit and stored through the information transfer unit into the saving area. Inasmuch as both the main and the additional data signals are stored in each processor unit, each processor can take over processing carried out in the other processor unit when the other processor unit is faulty.

6 Claims, 12 Drawing Sheets

INFORMATION PROCESSING SYSTEM CAPABLE OF READILY TAKING OVER PROCESSING OF A FAULTY PROCESSOR

BACKGROUND OF THE INVENTION

This invention relates to an information processing system which is structured by coupling a plurality of information processing units to one another.

Recently, the role of information processing systems has become important. Accordingly, interruption of such a system can result in severe losses.

Under the circumstances, there is a strong demand in present-day society for an information processing system which has a high reliability and a high resistivity to fault. In other words, twenty-four hour non-interruptable fault tolerant system are required.

In order to improve reliability in the information processing system, a wide variety of systems have been proposed which have a plurality of information processing units coupled to one another and which may be called multiprocessor systems. In such multiprocessor systems, when one of the information processing units is rendered faulty during processing of a data signal, another one of the information processing units takes over the processing and continues to execute the processing in place of the faulty information processing unit. With this structure, the information processing system can reliably continue processing without interruption.

More specifically, a conventional information processing unit has a control processing unit, a memory unit, and a communication processing unit all of which are coupled to one another through a bus line. The communication processing unit of each information processing unit is connected to the communication processing unit of the other information processing units through a communication path. In this event, the control processing unit of one information processing unit accesses the memory unit in response to a control program and a control data signal read out of the memory unit to renew contents of the memory unit. When the contents of the memory unit are renewed in one information processing unit, a communication message and a renewal data signal are stored in the memory unit under control of the control processing unit. Thereafter, a transfer request is sent from the control processing unit to the communication processing unit. Supplied with the transfer request, the communication control unit reads the communication message and the renewal data signal out of the memory unit to transfer them from the one imformation processing unit to the other information processing unit through the communication path.

In the other information processing unit, the communication message and the renewal data signal are stored in the memory unit of the other information processing unit under control of the communication processing unit. Subsequently, the communication processing unit informs the control processing unit of the completion of communication. The control processing unit renews contents of the memory unit of the other information processing unit by the use of the communication message and the renewal data signal so that the contents of the memory units are coincident with each other. The control processing unit produces an acknowledgement message stored in the memory unit and supplies a transfer request of the acknowledgement message to the communication processing unit of the other information processing unit. Responsive to the transfer request, the communication processing unit transfers the acknowledgement message to the communication processing unit of the one information processing unit.

In the one information processing unit, the communication processing unit makes the memory unit store the acknowledgement message and informs the control processing unit of reception of the acknowledgement message sent from the other information processing unit. Thus, the control processing unit of the one information processing unit starts a following processing after reception of the acknowledgement message from the other information processing unit.

It is to be noted that each memory unit of the one and the other information processing units is loaded with the control data signals necessary for the one and the other information processing units. Accordingly, when the one of the information processing units is faulty, the other information processing unit can take over the processing of the one information processing unit.

With this structure, each control processing unit must control communication so as to transfer the communication message and the control data signal to another information processing unit in accordance with the transfer request, as mentioned above. At any rate, an input/output instruction should be carried out so as to carry out the transfer operation in each information processing unit. Therefore, the overhead becomes large in each control processing unit, which brings about a degradation of throughput.

In another conventional multiprocessor system, a couple of information processing units are coupled to each other through a common or external memory connected to both common memory controllers of one and the other information processing units. Each of the information processing units comprises a control processing unit, a memory unit, and an external memory control unit.

In this case, the memory unit has a primary memory area for storing primary table information used by each control processing unit and an additional memory area for storing additional table information sent from the other information processing unit.

In the one information processing unit, the control processing unit transfers the primary table information to the external memory through the external memory control unit when the primary table information is renewed. More particularly, the control processing unit issues an operation command or indication to the external memory control unit on transferring the primary table information to the external memory. Responsive to the operation indication, the external memory control unit accesses the memory unit to read the primary table information out of the primary memory area and to thereafter transfer the primary table information to the external memory. Similar operations are carried out in the other information processing unit.

When one of the information processing units is faulty, the other information processing unit can take over processing carried out in the one information processing unit, similar to the above-mentioned conventional information processing system.

However, each control processing unit should execute the operation command in each information processing unit so as to transfer the table information to the external memory. This results in an increase of the program size. In addition, connection of the external memory brings about a reduction of throughput in the information processing system and raises the cost of the information processing system. Moreover, often execution of an operation command undesirably destroys address information indicated by the operation command.

SUMMARY OF THE INVENTION

It is an object of this invention to provide an information processing system which has a plurality of information processing units and which can establish high performance or throughput and high reliability even when either one of the information processing units is faulty.

It is another object of this invention to provide an information processing system of the type described, wherein it is possible to stably keep information stored in each memory unit.

An information processing system according to this invention has first and second processor units each of which have a bus line, a memory unit coupled to the bus line for storing a control program processed in each processor unit and a main data signal renewed from time in accordance with the control program read out of the memory unit, an execution processor coupled to the bus line for carrying out processing in accordance with the control program, and an information transfer unit coupled to the bus line for transferring the main data signal to the other processor unit and for transferring, to the memory unit, an additional data signal sent from the other processor unit. The memory unit has a control program area for storing the control program, a data area for storing the main data signal, and a saving area for saving the data signal of each processor unit and the additional data signal. The main data signal is transferred from the data area to the saving area on the basis of the control program under control of the execution processor with the main data signal kept in the data area. The information transfer unit has a bus control means coupled to the bus line for receiving the main data signal from the memory unit through the bus line when the main data signal is transferred from the data area to the saving area, processing control means coupled to the bus control means for carrying out transfer control of the main data signal sent from the bus control means and the additional data signal sent from the other processor unit, output transfer control means coupled to the processing control means for transferring the main data signal to the other processor unit under control of the processing control means, and input transfer control means coupled to the processing means and supplied with the additional data signal for transferring the additional data signal to the saving area through the bus line under control of the processing control means.

DESCRIPTION OF THE PREFERRED EMBODIMENTS

Figure 1:
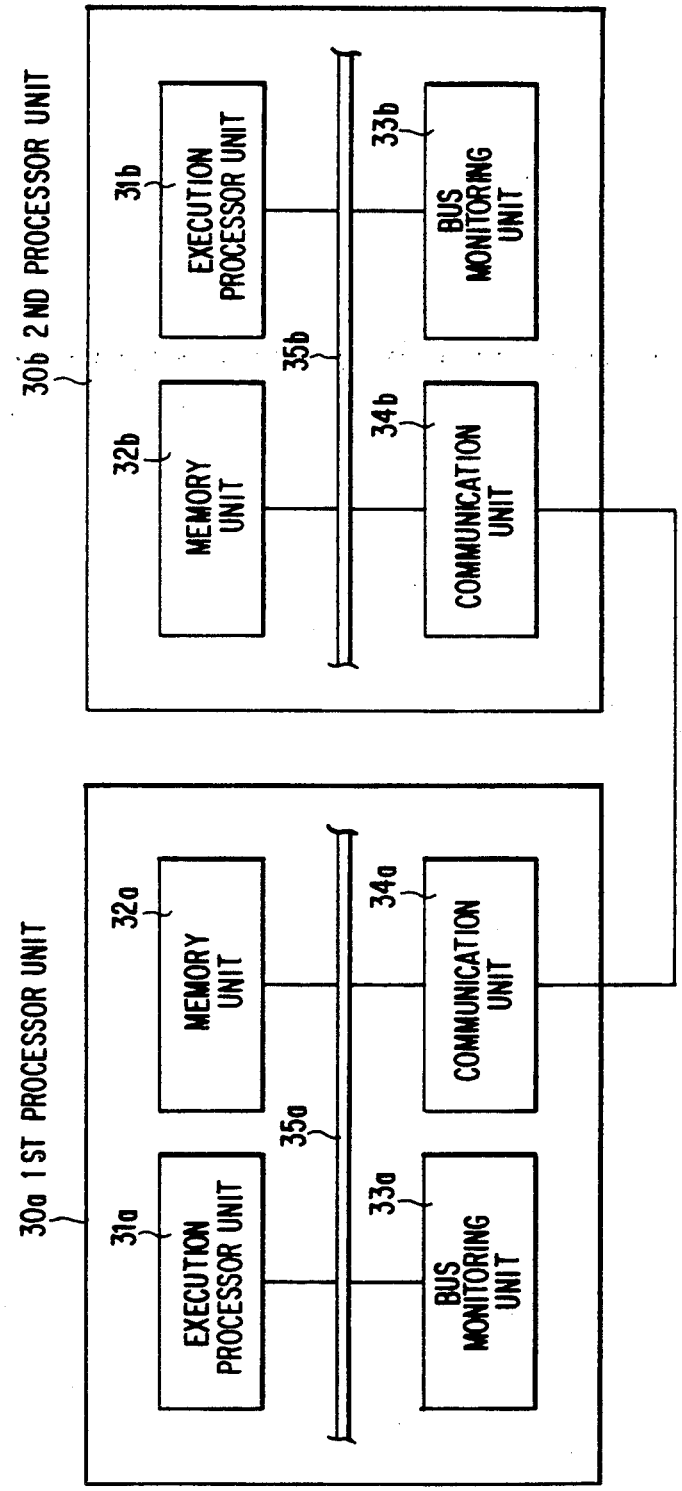
FIG. 1 shows a block diagram of a conventional information processing system.
Figure 2:
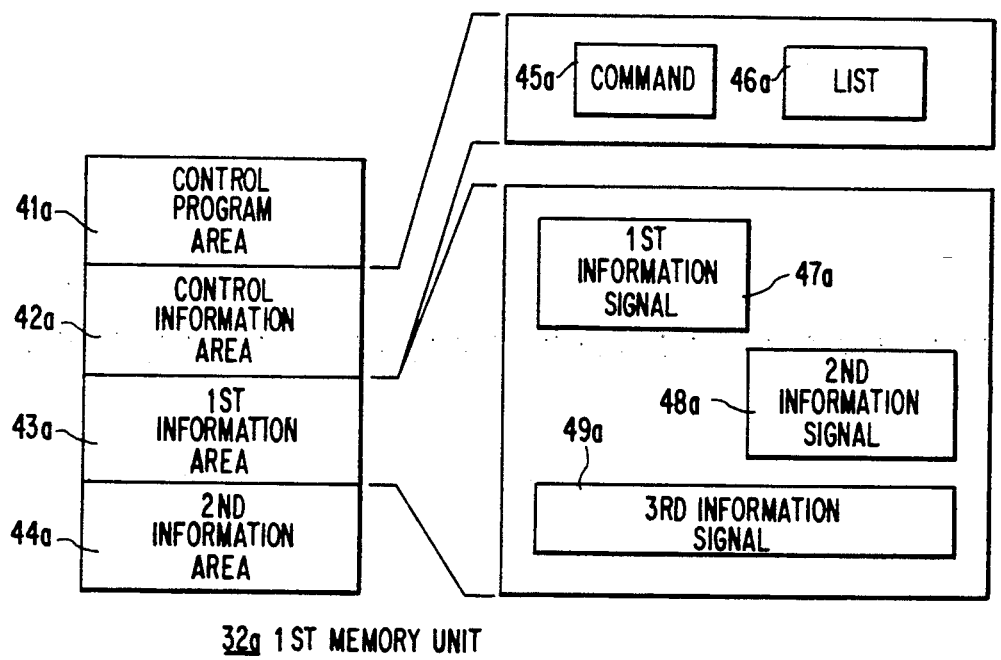
FIG. 2 shows a memory format for describing a memory unit used in the conventional information processing system illustrated in FIG. 1, FIGS. 3(A) and (B) show signal format for use in the conventional information processing system illustrated in FIG. 2.
Figure 3:
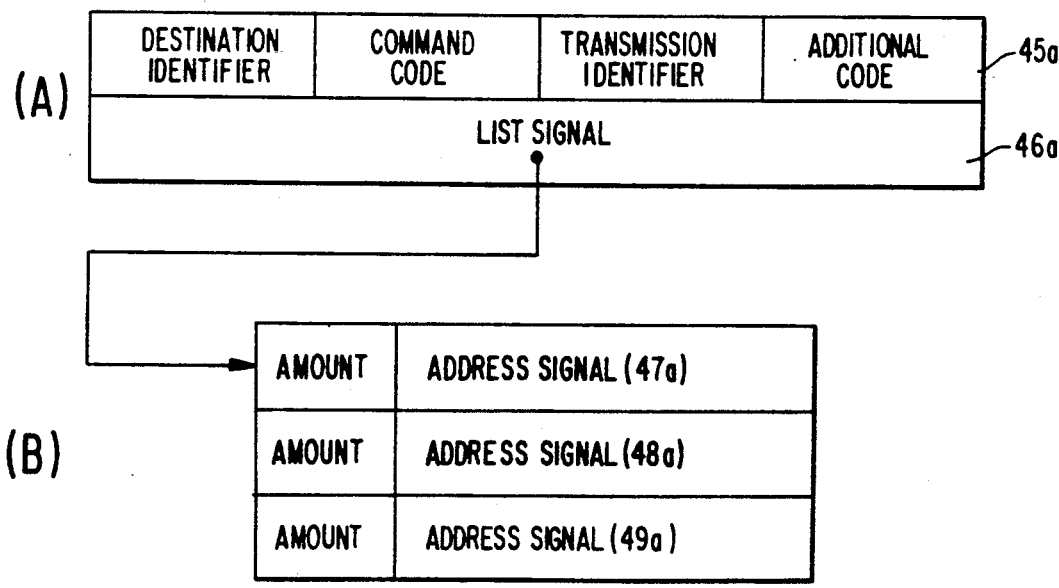

Referring to FIGS. 1 through 3, a conventional information processing system will be described which is operable as a multiprocessor system and which is specified by first and second processor units 30a and 30b in FIG. 1. The first and the second processor units 30a and 30b are similar in operation and structure to each other.

The first processor unit 30a has a first execution processor unit (EPU) or operation control processor 31a, a first memory unit 32a, a first bus monitoring unit 33a, and a first communication unit 34a, all of which are connected to a bus line 35a. Likewise, the second processor unit 30b has a second execution processor unit 31b, a second memory unit 32b, a second bus monitoring unit 33b, a second communication unit 34b, and a bus 35b. Thus, the corresponding elements of the first and the second processor units 30a and 30b will be distinguished from each other by the affixes a and b attached to reference numerals, respectively. The following description will be mainly made about the first processor unit 30a for the sake ofbrevity.

As illustrated in FIG. 1, the first and the second processor units 30a and 30b are connected to each other through the first and the second communication units 34a and 34b included in the first and the second processor units 30a and 30b.

Herein, it is assumed that the first and the second processor units 30a and 30b usually execute operations independently of each other.

Temporarily referring to FIG. 2 together with FIG. 1, the first memory unit 32a of the first processor unit 30a has a control program area 41a for storing a control program, a control information area 42a for storing control information signals or control data signals, a first information area 43a for storing information signals produced by the first processor unit 30a, and a second information area 44a for storing information signals produced by the second processor unit 30b. The control program defines the processing procedure of the first execution processor unit 31a while the control information signals are accessed or used during execution of the control program. The illustrated control information signals include a command signal 45a issued to the first communication unit 34a and a list signal 46a produced after the command 45a is issued, as will become clear as the description proceeds. In addition, the information signals stored in the first information area 43a are successively processed by the first execution processor unit 31a to be successively renewed. In FIG. 2, the information signals are exemplified by first, second, and third information signals 47a, 48a, and 49a which are produced or renewed during processing and each of which is specified by an address and a length (namely, an amount of information).

On the other hand, the second information area 44a of the first memory unit 32a is loaded with information signals transferred from the second processor unit 30b in a manner to be described later. From this fact, it is readily understood that the second memory unit 32b of the second processor unit 30b stores the information signals transferred from the first processor unit 30a. Thus, the information signals are preserved in both the first and the second processor units 30a and 30b. Accordingly, when one of the processor units is faulty, the other processor unit can take over processing of the one processor unit by the use of the information signals which are transferred from the one processor unit and which are stored in the other processor unit.

In FIG. 1, the first execution processor unit 31a executes processing in accordance with the control program to renew the information signals as exemplified by 47a to 49a in FIG. 2. When information signals are renewed or updated during the processing, the renewed information signals must be read out of the first memory unit 32a and transferred to the second processor unit 30b, as is readily understood from the description above. To this end, the first execution processor unit 31a produces the list signal 46a indicative of the amounts of information and addresses of the renewed information signals. In addition, the first execution processor unit 31a produces the command signal 45a indicative of a stored location of the list signal. At any rate, the list signal 46a and the command signal 45a are produced as an indication signal.

In FIGS. 3(A) and 3(B), the indication signal is composed of the command signal 45a and the list signal 46a following the command signal 45a. The command signal 45a conveys a destination identifier representative of a destination processor unit, a command code indicative of operation, a transmission identifier representative of a transmission processor unit, and an additional code representative of an amount of information in the list signal 46a.

The list signal 46a is composed of the amounts of information in the first through the third information signals 47a to 49a and the address signals which specify addresses of the first through the third information signals 47a to 49a, as illustrated in FIG. 3(B). In other words, the list signals 46a indicate addresses of the list composed of the first through the third information signals 47a to 49a.

The command signal 45a and the list signal 46a are read out of the memory unit 32a to be sent to the first communication unit 34a. The first communication unit 34a analyzes the command signal 45a and the list signal 46a to read the first through the third information signals 47a to 49a out of the first memory unit 32a. Thereafter, the first through the third information signals 47a to 49a are transferred to the second memory unit 32b of the second processor unit 30b.

With this structure, each of the first and the second execution processor units 31a and 31b should produce the indication as illustrated in FIGS. 3(A) and (B). In each processor unit 30a and 30b, processing must be executed in response to the indication and is therefore very complex. Thus, the conventional information processing system has limitations, as pointed out in the preamble of the instant specification.

As long as a combination of a command signal and a list signal is used, it is difficult to avoid similar defects even when communication units, such as 34a and 34b, are connected through a common memory.

Figure 4:
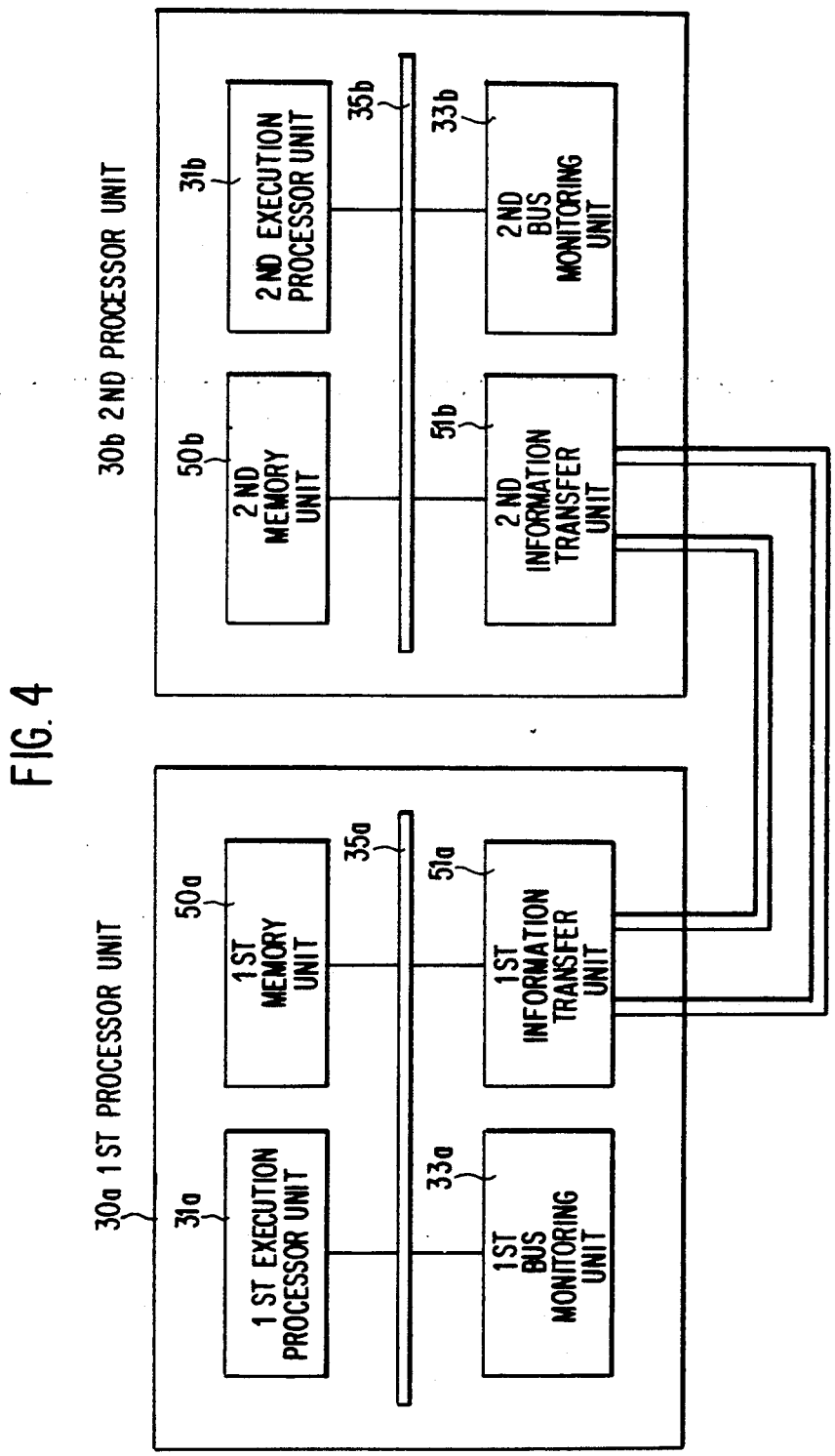
FIG. 4 shows a block diagram of an information processing system according to this invention.

Referring to FIG. 4, an information processing system according to a first embodiment of this invention has first and second processor units 30a and 30b each having similar parts designated by like reference numerals. More specifically, the first and the second processor units 30a and 30b have first and second memory units 50a and 50b, respectively, having memory areas different from those illustrated in FIG. 1 and first and second information transfer units 51a and 51b which are operable in a manner different from the communication unit 34 illustrated in FIG. 1.

Figure 5:
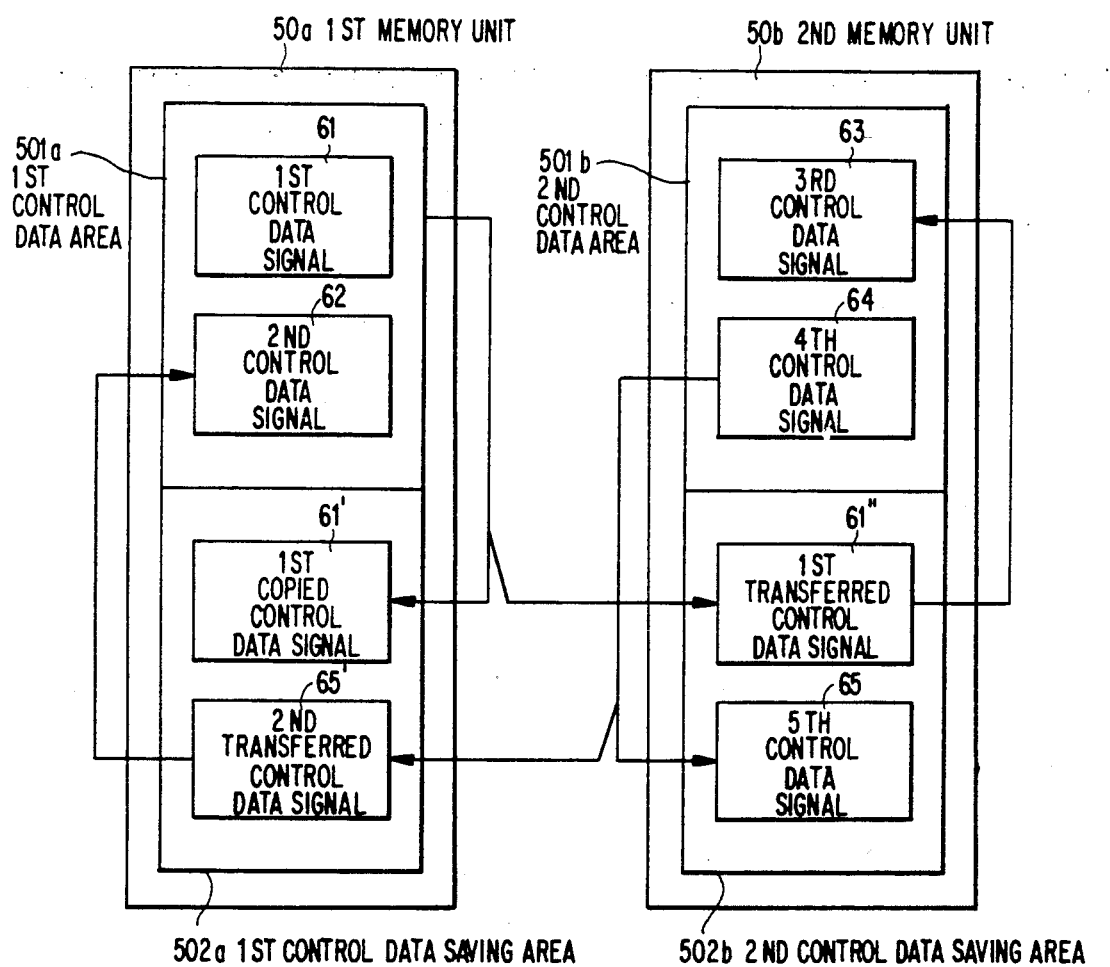
FIG. 5 shows a block diagram for use in describing a transfer operation carried out in the information processing system according to a first embodiment of this invention.

Referring to FIG. 5 in addition to FIG. 4, the first memory unit 50a has first and second control data areas 501a and 502a. Likewise, the second memory unit 50b has third and fourth control data areas 501b and 502b which are similar in structure and operation to the first and the second control data areas 501a and 502a, respectively. Each of the first and the third control data areas 501a and 501b may be similar to the control information area 42a illustrated in FIG. 2 while the second and the fourth control data areas 502a and 502b are operable so as to save control data signals stored in a manner to be described later and will be called first and second control data saving areas, respectively. In addition, it is needless to say that each of the first and the second memory units 50a and 50b has a control program area for storing a control program and an information area corresponding to the first information area which is illustrated in FIG. 2 and which stores information signals produced in each information processor unit.

As shown in FIG. 5, the first control data area 501a stores a first control data signal 61 and a second control data signal 62 which can be prepared for the first and the second processor units 30a and 30b, respectively, as will become clear as the description proceeds. Similarly, the third control data area 501b stores a third control data signal 63 and a fourth control data signal 64 which are prepared for the second and the first processor units 30b and 30a, respectively. Each of the first through the fourth control data signals 61 to 64 may be a data signal which forms a table and may be therefore called a table data signal. In this connection, the first and the fourth control data signals 61 and 64 may be referred to as main data signals while the second and the third control data signals 62 and 63 may be referred to as additional data signals.

In this situation, the first control data signal 61 is referenced and renewed by the first execution processor unit 31a while the third control data signal 63 is referenced and renewed by the second execution processing unit 31b.

For brevity of description, let the first control data signal 61 be renewed into a renewed control data signal in the first control data area 501a by the first execution processor unit 31a. In this case, the renewed control data signal is copied under control of the first execution processor unit 31a and is saved or stored into the second control data area, namely, the first control data saving area 502a as a first copied control data signal 61'. Moreover, the first copied control data signal 61' is transferred from the first control data saving area 502a to the fourth control data area, namely, the second control data saving area 502b and is stored as a first transferred control data signal 61". Such transfer of the first copied control data signal 61' is carried out without production of an input/output command after the first copied control data signal 61' is completely stored into the first control data saving area 502a.

The first transferred control data signal 61" is sent from the second control data saving area 502b as the third control data signal 63 when the first processor unit 30a becomes faulty. As a result, the second processor unit 30b can take over processing of the first processor unit 30a by the use of the third control data signal 63 sent from the first processor unit 30a.

Likewise, the fourth control data signal 64 is renewed by the second execution processor unit 31b and is saved or preserved in the second control data saving area 502b as a fifth control data signal 65. Thereafter, the fifth control data signal 65 is transferred through the information transfer unit 51b and 51a (FIG. 4) to the first control data saving area 502a as a second transferred control data signal 65'. It is to be noted that no input/output command is issued from the second execution processor unit 31b on transferring the fifth control data signal 65.

The second transferred control data signal 65' is moved from the first control data saving area 502a as the second control data signal 62 to the first control data area 501a. As a result, the first execution processor unit 31a can access the second control data signal 62 to take over processing of the second processor unit 30b.

Figure 6:
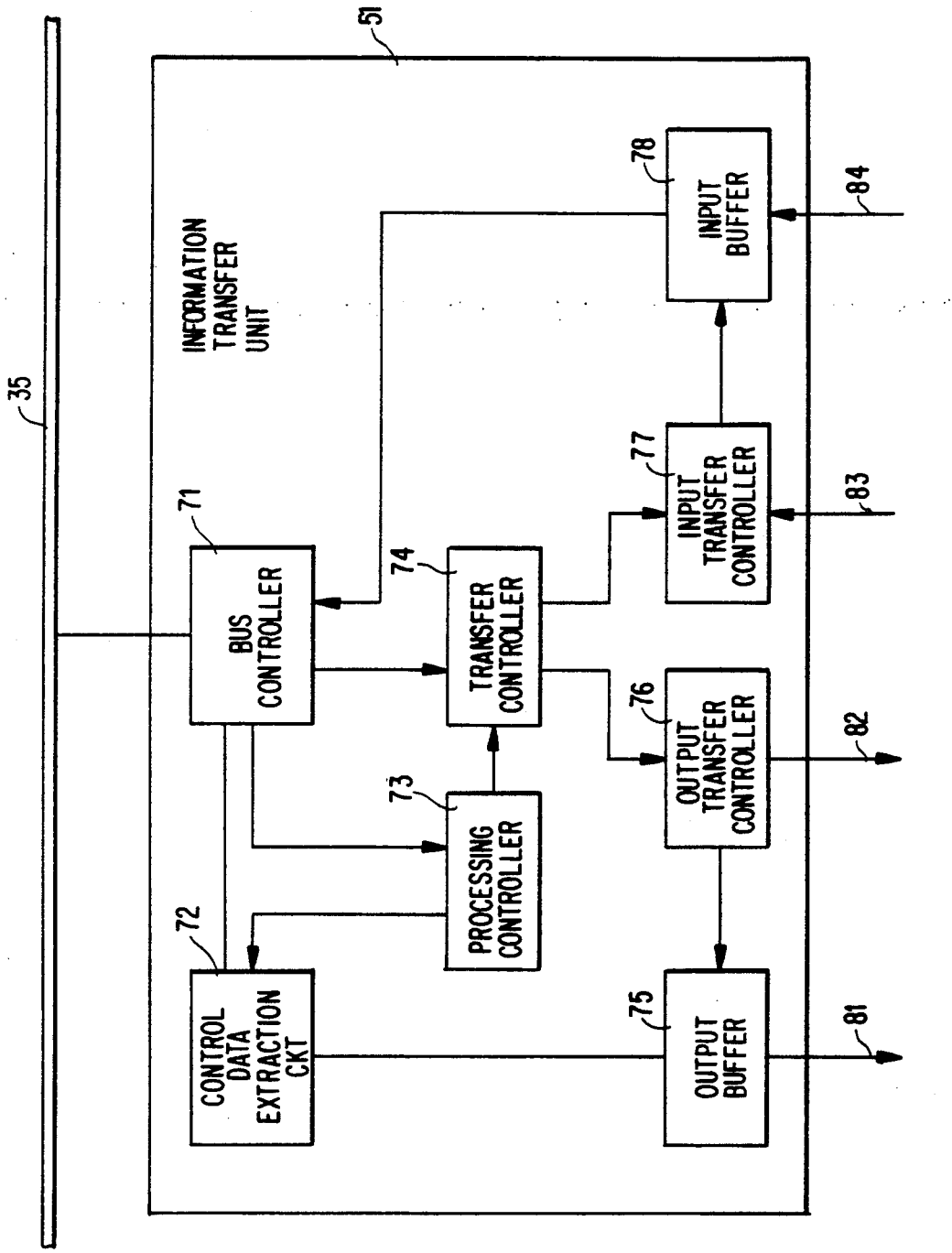
FIG. 6 shows a block diagram of an information transfer unit used in the information processing system illustrated in FIG. 5.

Referring to FIG. 6, an information transfer unit 51 is available as each of the first and the second information transfer units 51a and 51b. In this connection, affixes are omitted from FIG. 6. The illustrated information transfer unit 51 can transfer each control data signal between the first and the second processor units 30a and 30b in the above-mentioned manner. Specifically, the information transfer unit 51 has a bus controller 71 and a control data extraction circuit 72 which are connected to the bus line 35 through first and second lines and which will be collectively called a bus interface circuit.

The illustrated information transfer unit 51 also has a processing controller 73, a transfer controller 74, an output buffer 75, an output transfer controller 76, an input transfer controller 77, and an input buffer 78.

The bus controller 71 is connected to the processing controller 73, the transfer controller 74, and the input buffer 78 to control a connection between the bus line 35 and each of the transfer controller 74 and the input buffer 78. The control data extraction circuit 72 is connected to both the processing controller 73 and the output buffer 75 and is operable to extract a control data signal from the bus line 35 and to send an extracted control data signal to the output buffer 75 under control of the processing controller 73. The processing controller 73 monitors the bus controller 71 to supply the transfer controller 74 with an indication which represents whether or not transfer of the control data signal is to be carried out. The transfer controller 74 is connected to the output transfer controller 76 and the input transfer controller 77 to control the output and the input buffers 75 and 78. As a result, the output buffer 75 supplies the control data signal to another information transfer unit through an output data line 81 under control of the output transfer controller 76. In this event, the output transfer controller 76 produces a transfer indication signal through an output indication line 82. The transfer indication signal indicates transfer of the control data signal. A combination of the output transfer controller 76 and the output buffer 75 may be called an output circuit.

On the other hand, the input buffer 78 stores a control data signal sent from another information transfer unit through an input data line 83 when the input transfer controller 77 receives the transfer indication signal from another information transfer unit through an input transfer line 84. A combination of the input transfer controller 77 and the input buffer 78 may be referred to as an input circuit.

In FIGS. 4 through 6, let the first control data signal 61 (FIG. 5) be transferred from the first processor unit 30a (FIG. 4) to the second processor unit 30b through the first and the second information transfer units 51a and 51b as shown in FIG. 6. In this event, the first control data signal 61 is stored as the first copied control data signal 61' into the first control data saving area 502a (FIG. 5) on one hand and is sent through the bus line 35a on the other hand. In the first information transfer unit 51a, the processing controller 73 makes the control data extraction circuit 72 monitor the bus line 35a. When the first control data signal 61 is detected by the control data extraction circuit 72 of the first information transfer unit 51a, the output buffer 75 temporarily stores the first control data signal 61 and thereafter sends the same to the input buffer 78 of the second information transfer unit 51b in the second processor unit 30b. Consequently, the first control data signal 61 is automatically stored in the input buffer 78 of the second information transfer unit 51b.

When the first control data signal 61 is completely stored as the first copied control data signal 61' in the first control data saving area 502a of the first memory unit 50a, the first execution processor unit 31a sends a write-in command to the first information transfer unit 51a. The write-in command is delivered through the bus controller 71 to the processing controller 73. Supplied with the write-in command, the processing controller 73 controls the transfer controller 74 and the output transfer controller 76 to make the output transfer controller 76 produce the transfer indication signal which is sent to the input transfer controller 77 of the second information transfer unit 51b.

In the second processor unit 30b, the processing controller 73 enables the transfer controller 74 and the input transfer controller 77. As a result, the first control data signal 61 is read out of the input buffer 78 of the second information transfer unit 51b and is sent to the second memory unit 50b of the second processor unit 30b through the bus controller 71 and the bus line 35b (FIG. 4) of the second processor unit 30b. Thus, the first control data signal 61 is stored as the first transferred control data signal 61" in the second control data saving area 502b of the second memory unit 50b.

Similar operation is carried out when the control data signal is transferred from the second processor unit 30b to the first processor unit 30a. Accordingly, a description will be omitted relating to transferring the control data signal from the second processor unit 30b to the first processor unit 30a.

Figure 7:
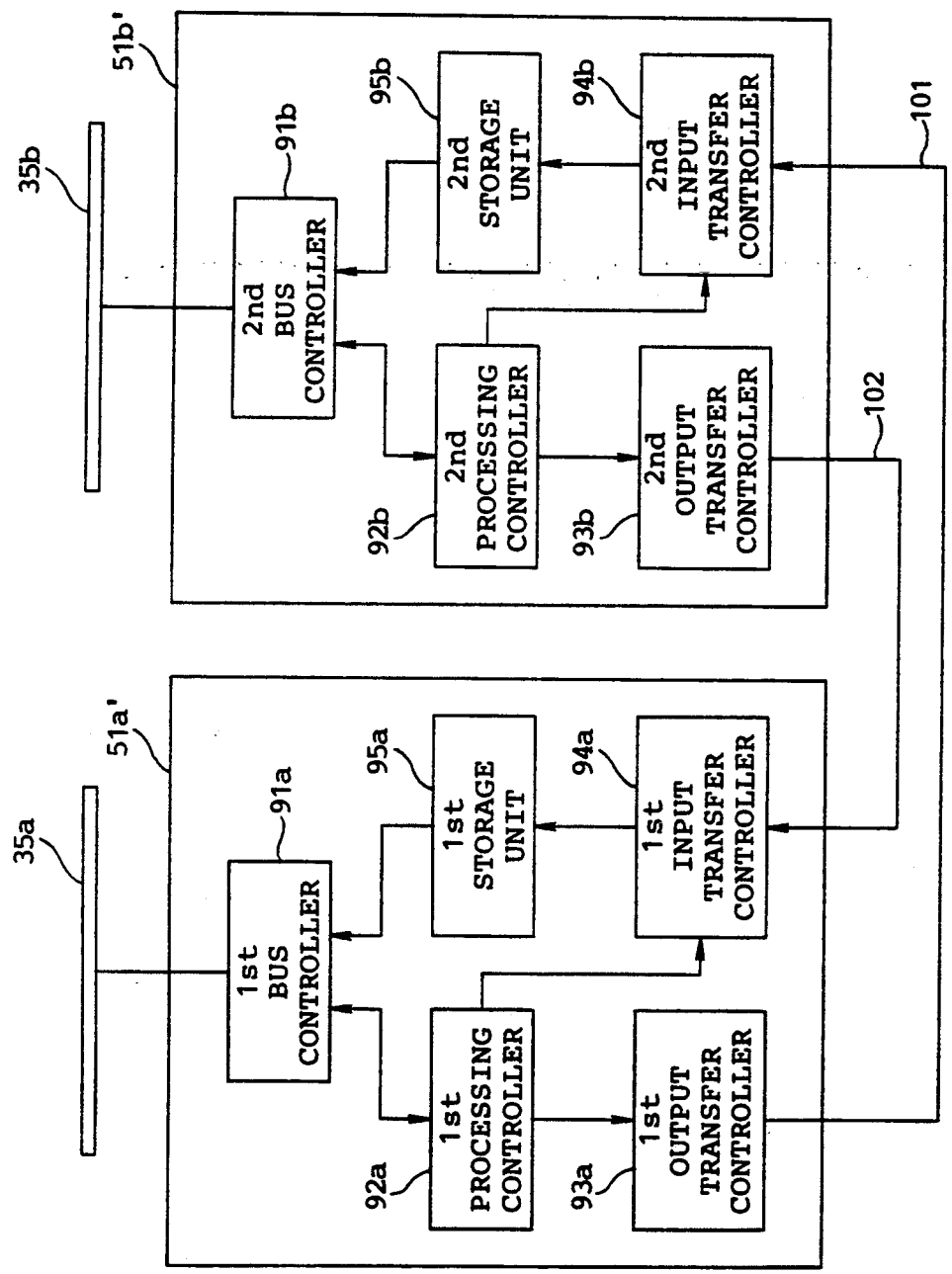
FIG. 7 shows a block diagram of an information transfer unit used in an information processing system according to a second embodiment of this invention.

Referring to FIG. 7, an information processing system according to a second embodiment of this invention is similar in structure and operation to that illustrated in FIG. 4 except that each of the first and the second memory units 50a and 50b stores information somewhat different from that illustrated in FIG. 5 and that first and second information transfer units illustrated in FIG. 7 are different in structure from those illustrated in FIG. 4. Accordingly, only the first and the second information transfer units are shown in FIG. 7 and are depicted at 51a' and 51b' in FIG. 7. The first and the second information transfer units 51a' and 51b' are similar in structure to each other and therefore have similar components or elements distinguished by a and b following the reference numerals. Specifically, the first information transfer unit 51a' has a first bus controller 91a, a first processing controller 92a connected to the first bus controller 91a, a first output transfer controller 93a connected to the first processing controller 92a, a first input transfer controller 94a controlled by the first processing controller 92a, and a first storage unit 95a connected to both the first input transfer controller 94a and the first bus controller 91a. Likewise, the second information transfer unit 51b' has a second processing controller 92b, a second transfer controller 93b, a second transfer controller 94b, and a second storage unit 95b. In addition, the first transfer controller 93a is connected to the second input transfer controller 94b through a first transmission path 101 while the second transfer controller 93b is connected to the first input transfer controller 94a through a second transmission path 102.

The first and the second information transfer units 51a' and 51b' are operable in cooperation with the memory units 50a and 50b (FIG. 4) and the execution processing units 31a and 31b.

Figure 8:
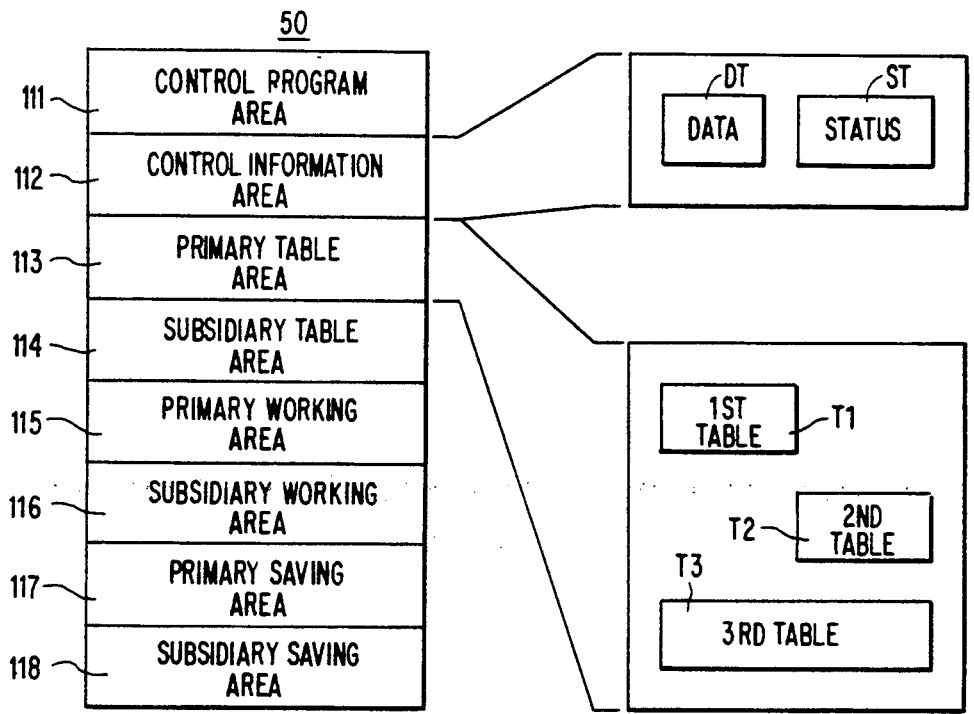
FIG. 8 shows a memory format of a memory unit used in the information processing system illustrated in FIG. 7.

Referring to FIG. 8, a memory unit 50 (affix omitted) is available for each of the first and the second memory units 50a and is divided into first through eighth areas composed of a control program area 111, a control information area 112, a primary table area 113, a subsidiary table area 114, a primary working area 115, a subsidiary working area 116, a primary saving area 117, and a subsidiary saving area 118. Specifically, the control information area 112 serves to store a data signal DT and a status signal ST which are used for transmitting information between the first and the second information transfer units 51a' and 51b'. The primary table area 113 is for storing a table information signal processed by the execution processor unit 31 of an information processor unit which includes the memory unit 50 illustrated and which may be referred to as a self-processor unit. In this connection, the primary table area 113 may be called a self-table area and serves to store tables which are exemplified by first through third tables T1, T2, and T3 in FIG. 8 and which are renewed at every one of the tables. The tables are produced in the form of the table information signal like the control data signal illustrated in FIG. 5.

On the other hand, the subsidiary table area 114 is for storing a table information signal which is representative of tables used by the other processor unit, namely, a non-self-processor and which is sent from the non-self-processor unit.

Moreover, the primary working area 115 illustrated in the memory unit 50 is for use in combination with the primary table area 113 to transfer the table information signal read out of the primary table area 113. Specifically, the table information signal is sent from the primary table area 113 to the primary working area 115.

The subsidiary working area 116 is for use in combination with the subsidiary table area 114 to move, from the subsidiary saving area 118 to the subsidiary working area 116, the table information signal sent from the other processor unit and to thereafter move the table information signal to the subsidiary table area 114.

Figure 9:
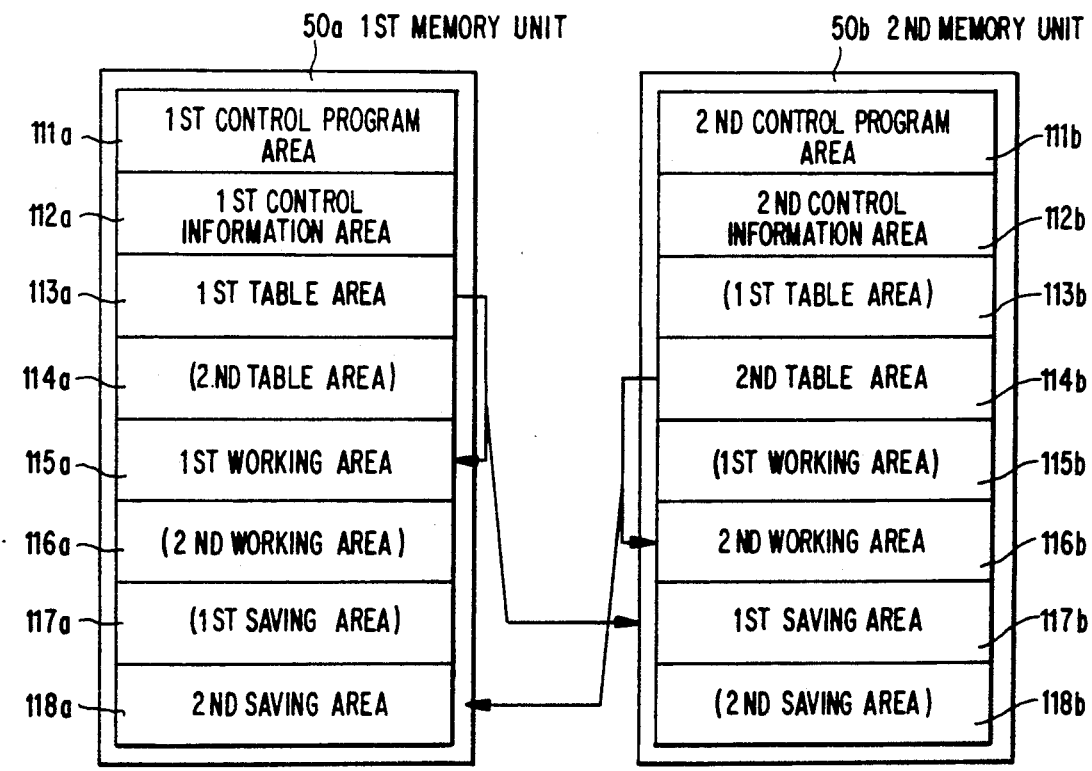
FIG. 9 shows a block diagram for use in describing a transfer operation carried out in the information processing system according to the second embodiment of this invention.

Referring to FIG. 9 in addition to FIGS. 7 and 8, the first memory unit 50a of the first processor unit 30a has, as the control program area 111, the control information area 112, and the primary table area 113 (FIG. 8), a first control program area 111a, a first control information area 112a, and a first table area 113a which are assigned to the first processor unit 30a, respectively. Similarly, a second table area 114a, a first working area 115a, a second working area 116a, a first saving area 117a, and a second saving area 118a are present in the first memory unit 50a as the subsidiary table area 114, the primary working area 115, the subsidiary working area 116, the primary saving area 117, and the subsidiary saving area 118, respectively.

Likewise, the second memory unit 50b has a second control program area 111b and a second control information area 112b which are assigned to the second processor unit 30b. In addition, the second memory unit 50b has a first table area 113b, a second table area 114b, a first working area 115b, a second working area 116b, a first saving area 117b, and a second saving area 118b which are similar to those of the first memory unit 50a, respectively. The areas in parentheses are for storing copied information as will become clear later.

Now, it is assumed that the first execution processor unit 31a in the first processor unit 30a executes the control program read out of the first control program area 111a of the memory unit 50a and renews the tables stored in the first table area 113a. In this event, the first through the third tables T1 to T3 (FIG. 8) are assumed to be renewed into first through third renewed tables by the first execution processor unit 31a. After completion of the renewal of the first through the third tables T1 to T3, the first execution processor unit 30a executes a transfer instruction to move the first through the third renewed tables T1 to T3 to the first working area 115a. Thereafter, the first execution processor unit 31a produces an indication for the information transfer unit 51a and writes the indication into the control information area 112a as the data signal DT.

On detection of the indication sent from the first execution processor unit 31a, the first information transfer unit 51a produces the status signal ST representative of status in the first information transfer unit 51a to rewrite the status signal ST and thereafter moves the first through the third renewed tables to the first saving area 117b of the second memory unit 50b.

Likewise, the second memory unit 50b of the second processor unit 30b moves tables from the second table area 114b to the second working area 116b. Thereafter, the tables are transferred from the second working area 116b to the second saving area 118a of the first memory unit 50a.

Thus, the table information signals of the first and the second memory units 30a and 30b are saved into the other memory units 30b and 30a, respectively.

Figure 10:
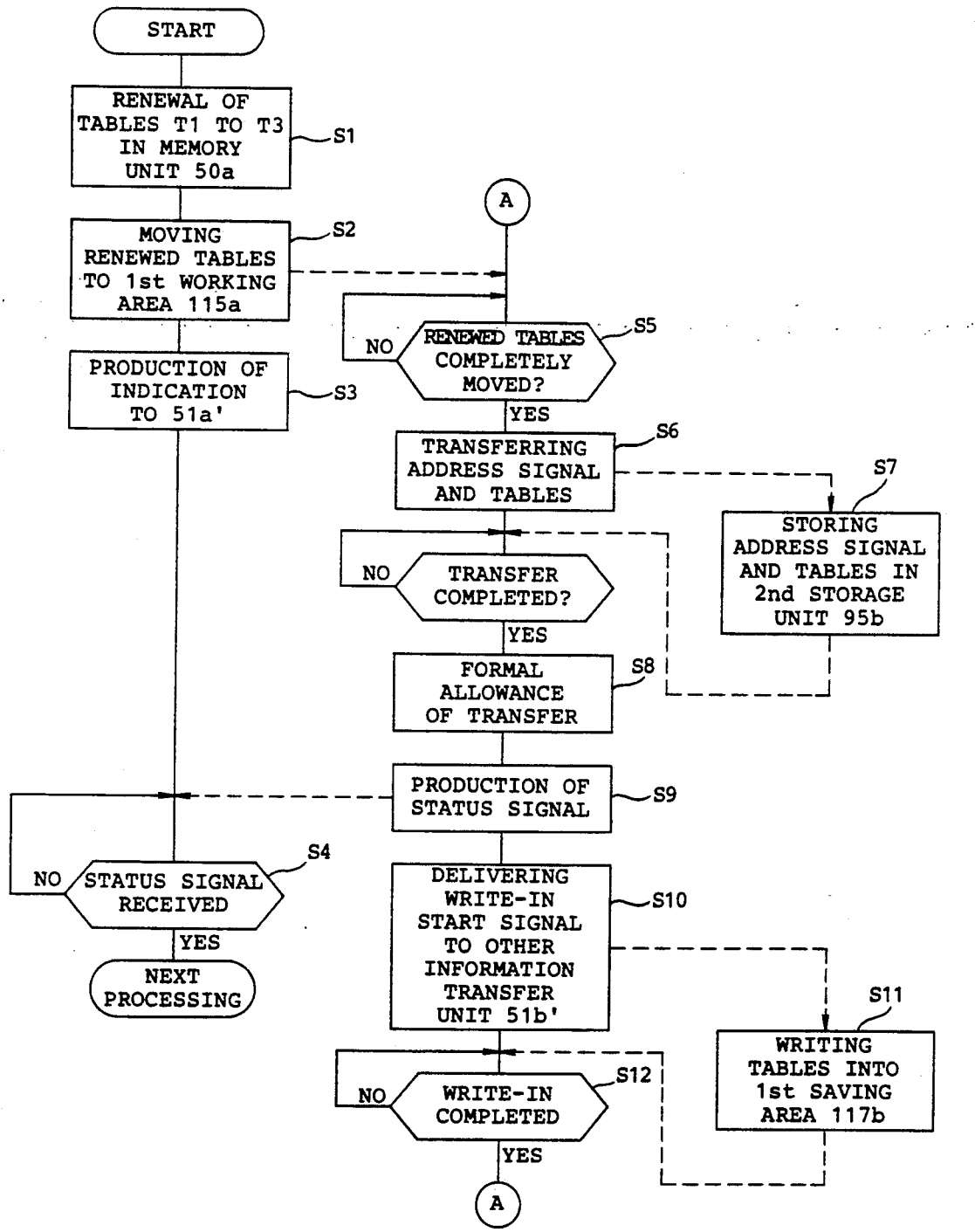
FIG. 10 shows a flow chart for use in describing operation of the information processing system according to the second embodiment of this invention.

Referring to FIG. 10, description will be made about an operation of the first and the second execution processor units 31a and 31b, the first and the second information transfer units 51a' and 51b', and the first and the second memory units 50a and 50b. For brevity of description, let the first execution processor unit 31a be operated in cooperation with the first information transfer unit 51a' and the first memory unit 50a. Under the circumstances; the first execution processor unit 31a starts operation and proceeds to a first step S1 to renew the tables T1 through T3 stored in the first table area 113a of the first memory unit 50a. Subsequently, renewed tables are moved at a second step S2 from the first table area 113a to the first working area 115a of the first memory unit 50a. The second step S2 is followed by a third step S3 at which the indication is issued to the information transfer unit 51a' to indicate transfer of the renewed tables. Such an operation is practically carried out by writing the indication into the first control information area 112a as the data signal DT (FIG. 8). In this situation, the first execution processor unit 31a waits for reception of the status signal ST from the first information transfer unit 51a' at a fourth step S4. On reception of the status signal ST, next processing is carried out by the first execution processor unit 31a.

From this fact, it is readily understood that the first execution processor unit 31a may produce the indication of transferring the tables and may store the indication into the first memory unit 30a. Such an operation can be quickly carried out as compared with the conventional method of executing an input/output instruction.

On the other hand, the first information transfer unit 51a' monitors the first memory unit 50a in a manner to be described below. At a fifth step S5, the first information transfer unit 51a' detects whether or not the tables are completely moved from the first table area 113a to the first working area 115b by monitoring an address signal assigned to the first working area 115a. When the renewed tables are completely moved to the first working area 115a, the first information transfer unit 51a' automatically detects an address signal and the table information signal sent through the bus line 35a even when the first execution processor unit 31a produces no indication. Thereafter, the first information transfer unit 51a' transfers the address signal and the table information signal to the second information transfer unit 51b' of the second processor unit 30b at a sixth step S6. The address signal and the table information signal are sent to the second processor unit 30b and temporarily stored in the second storage unit 95b (FIG. 7) of the second information transfer unit 52b' at a seventh step S7, as shown by a broken line.

When the first information transfer unit 51a' detects that the address signal and the table information signal are completely transferred to the second information transfer unit 51b', the first information transfer unit 51a' analyzes the data signal DT. If the data signal DT indicates transfer of the address signal and the table information signal, the first execution transfer unit 31a allows the first information transfer unit 51a' to formally transfer the address signal and the table information signal at an eighth step S8. Subsequently, the first information transfer unit 51a' writes the status signal ST (FIG. 8) into the first control information area 112a at a ninth step S9 after the table information signal is completely stored in the second storage unit 95b. The first execution processor unit 31a reads the status signal ST out of the first control information area 112a and detects status of the first information transfer unit 51a'. Thus, the first information transfer unit 51a' sends a response signal back to the first execution processor unit 31a.

Thereafter, the first information transfer unit 51a' delivers a write-in start signal to the second information transfer unit 51b' at a tenth step S10. In the second information transfer unit 51b', the table information signal is sent from the second storage unit 95b to the second memory unit 50b and is stored into the first saving area 117b (FIG. 9) of the second memory unit 50b, as shown at an eleventh step S11. At a twelfth step S12, the first information transfer unit 51a' detects whether or not transfer operation is completed. Thereafter, operation is returned back to a step A.

The first and the second transfer units 51a' and 51b' illustrated in FIG. 7 can carry out the above-mentioned transfer operation.

The first and the second transfer units 51a' and 51b' are similar in operation to each other. Accordingly, description will be made about either one of the first and the second transfer units 51a' and 51b' by omitting suffixes a and b. The processing controller 92 serves to control a whole operation of the information transfer unit 51. To this end, the processing controller 92 delivers an indication to the bus controller 91 to enable the bus controller 91. When the address signal and the table information signal are detected from the working area 115 of the memory unit 50, the processing controller 92 drives the output transfer controller 93 to transmit the address signal and the table information signal to the other information transfer unit through the transmission path 101 or 102.

On the other hand, an address signal and a table information signal sent from the other information transfer unit are received by the input transfer controller 94 and are thereafter stored in the storage unit 95. When the input transfer controller 94 receives an indication from the other information transfer unit, the processing controller 92 controls the bus controller 91 in response to the address signal stored in the storage unit 95 to transfer the table information signal to the main memory 50 and to thereby write the table information signal into the saving area.

Inasmuch as the working area is included in the memory unit 50, it is possible to change an address of the table information signal to another address.

In FIG. 7, the bus controller 91 serves as a bus interface circuit similar to the combination of the bus controller 71 and the control data extraction circuit 72 illustrated in FIG. 6.

Figure 11:
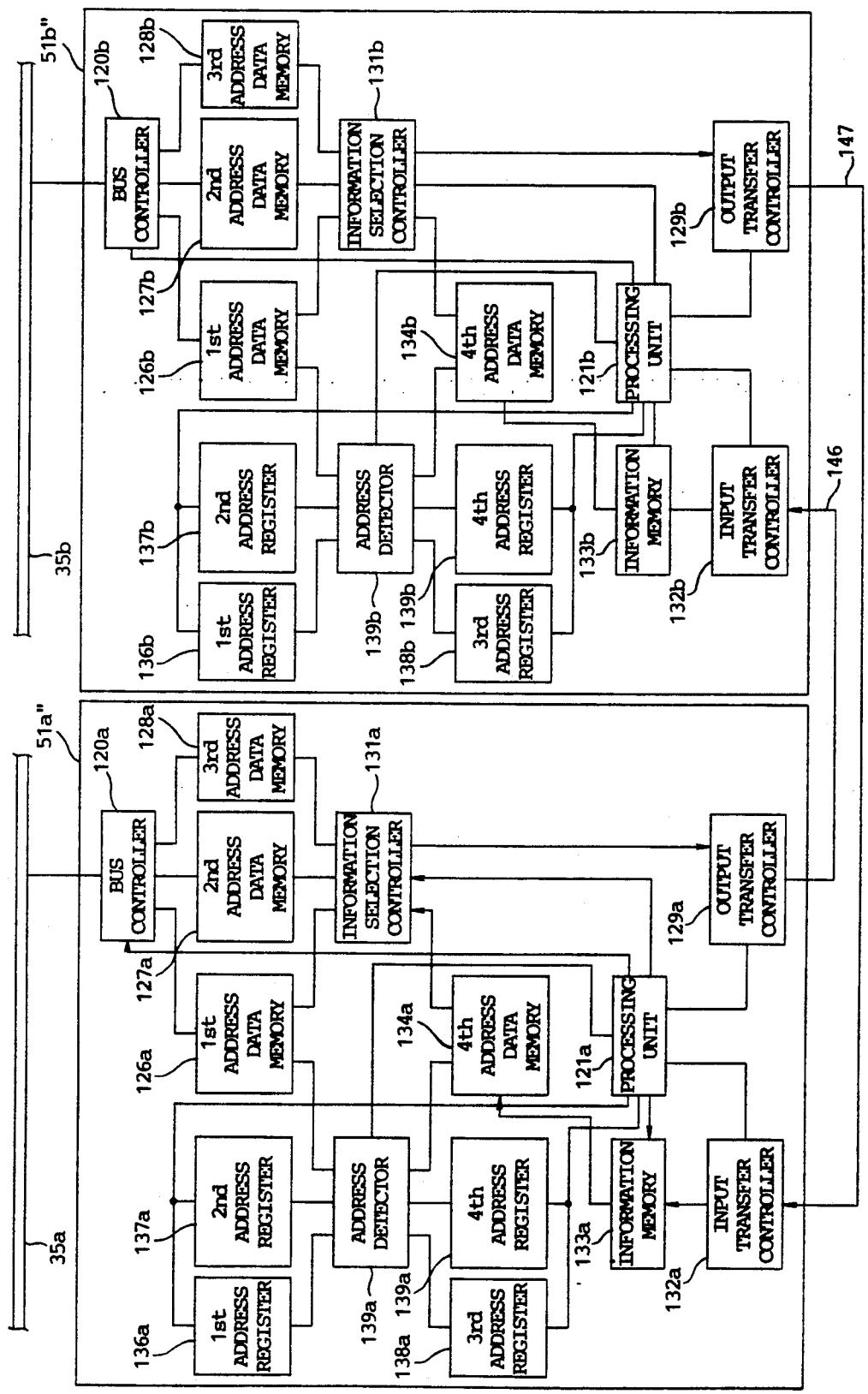
FIG. 11 shows a block diagram for use in describing an information processing system according to a third embodiment of this invention.
Figure 12:
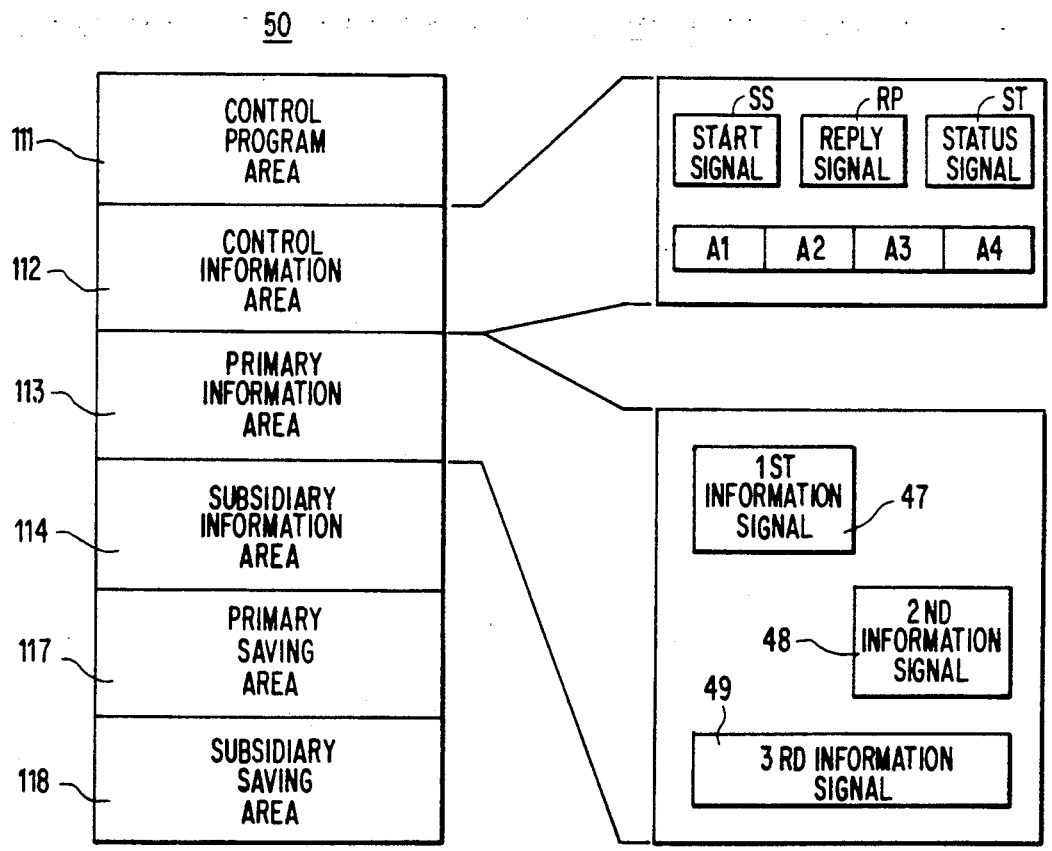
FIG. 12 shows a memory format of a memory unit used in the information processing system according to the third embodiment of this invention.

Referring to FIGS. 11 and 12, an information processing system according to a third embodiment of this invention has similar parts designated by like reference numerals illustrated in FIG. 4, although each of the first and the second memory units 50a and 50b stores information different from that illustrated in FIG. 4 and the information transfer units illustrated in FIG. 11 are somewhat different in structure and operation from those illustrated in FIG. 4 and are depicted at 50a'' and 50b''.

Description will be at first directed to each memory unit 50 (suffix omitted) illustrated in FIG. 12 before the first and the second information transfer units 50a'' and 50b'' are described with reference to FIG. 11. In FIG.

12, the memory unit 50 is similar to that illustrated in FIG. 8 except that no working area is present in the memory unit 50 illustrated in FIG. 12. In other words, the illustrated memory unit 50 has a control program area 111, a control information area 112, a primary information area 113, a subsidiary information area 114, a primary saving area 117, and a subsidiary saving area 118, like in FIG. 8. It is to be noted in FIG. 12 that the control information area 112 stores an acceptance signal SS, a reply signal RP, and a status signal ST which are used to transfer a data signal between the execution processor unit 31 (suffix omitted) illustrated in FIG. 4 and the information transfer unit 51 in a manner to be described later. In addition, first through fourth area indication signals A1 to A4 are stored in the control information area 112 and may be address signals, as will become clear later.

Like in FIG. 8, the primary information area 113 stores first through third information signals 47 to 49 produced in the one information processor unit itself while the subsidiary information area 114 stores information signals sent from another information processor unit. On the other hand, the first saving area 117 stores copied information signals of the information signals 47 to 49 stored in the primary information area 113. The copied information signals may be called saved information signals. The subsidiary saving area 118 stores, as saved information signals, information signals sent from another information processor unit.

Turning back to FIG. 11, the first and the second information transfer units 51a'' and 51b'' are similar in structure to each other. Accordingly, description will be directed only to the first information processor unit 51a'' without suffixes.

The illustrated information transfer unit 51'' has a bus controller 120 for controlling information transfer between the bus line 35 and each of the execution processor unit 31 (FIG. 4) and the memory unit 50. A processing unit 121 controls a whole of the information transfer unit 51'' in response to a signal sent from the bus controller 120. To this end, the illustrated processing unit 121 is connected to the bus controller 120. Herein, it is assumed that, when the execution processor unit 31 executes a memory transfer request or a start request, the processing unit 121 detects such execution of a request in response to the signal delivered through the bus controller 120. In this event, the processing unit 121 accesses the memory unit 50 through the bus controller 120 and the bus line 35 to read information signals (described later) out of the memory unit 50 and stores the same into first, second, and third address data memories 126, 127, and 128. Thereafter, the processing unit 121 drives an output transfer controller 129 connected to an information selection controller 131. The information selection controller 131 selects the first through the third address data memories 126 to 128 to selectively supply an address data signal to the output transfer controller 129. Such an address data signal is sent as a transfer information signal from the output transfer controller 129 to the other information transfer unit 50b''.

On the other hand, a transfer information signal sent from the other information transfer unit 50b'' is received by an input transfer controller 132a and is stored in an information memory 133. In this event, the processing unit 121 which is connected to the input transfer controller 132 is supplied with an indication sent from the other information transfer unit 50b''. Responsive to the indication, the processing unit 132 enables the information memory 133 to make the information memory 133 transfer the transfer information signal to a fourth address data memory 134. Thereafter, the transfer information signal is sent through the information selection controller 131 to the bus controller 120. The bus controller 120 controls the bus line 35 in accordance with the address information signal to carry out write-in operation into the saving area 118 (FIG. 12) of the memory unit 50.

In FIG. 11, first through fourth registers 136 to 139 are for storing the area indication signals A1 to A4. Specifically, the area indication signals stored in the first and the second address registers 136 and 137 define an address area wherein an information signal can be received by the bus controller 120 from the bus line 35. In the example being illustrated, the first register 136 is loaded with a minimum address signal while the second register 137 is loaded with a maximum address signal. The minimum and the maximum address signals define the primary saving area 117 and indicate the first and the second area indication signals A1 and A2.

An address information signal stored in the first address data memory 126 is compared by an address detector 141 with the minimum and the maximum address signals stored in the first and the second address registers 136 and 137. The address detector 141 supplies the processing unit 121 with a result signal representative of a result of comparison. Responsive to the result signal, the processing unit 121 controls the output transfer controller 129 to make it carry out output control.

Likewise, third and fourth address registers 138 and 139 indicate the subsidiary saving area used when the information transfer unit 51'' carries out a write-in operation into the memory unit 50. Specifically, the third and the fourth address registers 138 and 139 store minimum and maximum address signals which are representative of minimum and maximum addresses determined for the subsidiary saving area, respectively. When an address information signal is read out of the information memory 133 and stored into the fourth address data memory 134, the address information signal is compared by the address detector 141 with the minimum and the maximum address signals stored in the third and the fourth address registers 138 and 139. The address detector 141 supplies the processing unit 121 with the result signal representative of the result of comparison. The processing unit 121 carries out input control in accordance with the result signal.

In addition, the output transfer controller 129a of the information transfer unit 51a'' is connected to the input transfer controller 132b of the information transfer unit 51b'' through a first transmission path 146 while the input transfer controller 132a is connected to the output transfer controller 129b through a second transmission path 147.

Figure 13:
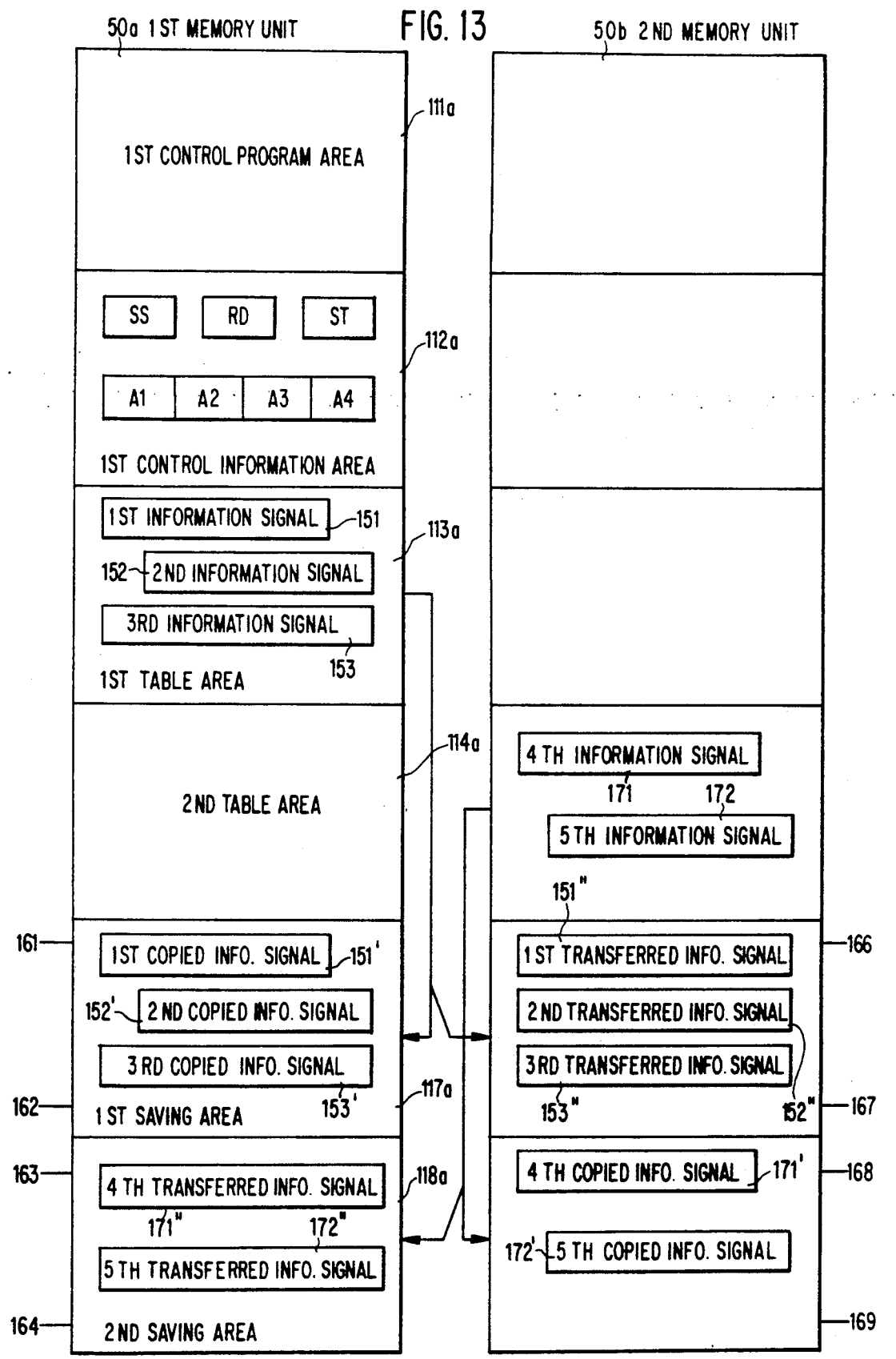
FIG. 13 shows a block diagram for use in describing a transfer operation of the information processing system according to the third embodiment of this invention.
Figure 14:
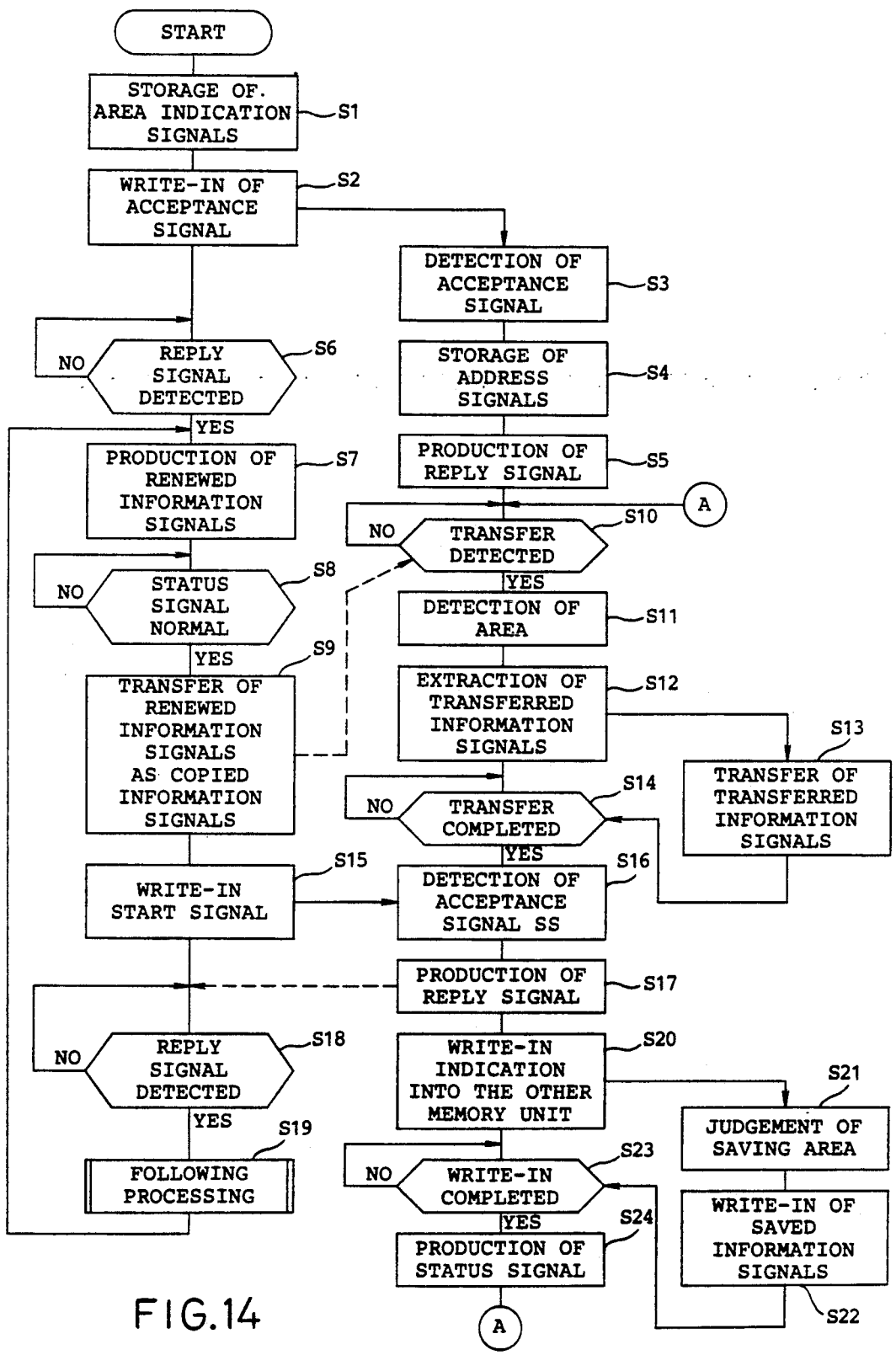
FIG. 14 shows a flow chart for use in describing an operation of the information processing system according to the third embodiment of this invention.

Referring to FIGS. 13 and 14 together with FIG. 11, description will be made as regards the first and the second processor units 30a and 30b. In FIG. 13, let the first execution processor unit 31a execute the control program stored in the first memory unit 50a and renew first through third information signals 151, 152, and 153 stored in the primary information area 113a of the first memory unit 50a. Under the circumstances, when the first execution processor unit 31a reads the status signal ST out of the control information area 112a and detects that the first information transfer unit 51a'' is available, the first through the third information signals 151 to 153 are transferred to the primary saving area 117a with the first through the third information signals 151 to 153 left in the primary information area 113a and are stored as first through third copied information signals 151' to 153' in the primary saving area 117a, respectively.

In order to carry out such transfer operation, the primary saving area 117a is defined by the control program. More specifically, the primary saving area 113a is determined by a primary start address, namely, the minimum address 161 and a primary end address, namely, the maximum address 162 which are stored in the control information area 112a as A1 and A2. In addition, the subsidiary saving area 118a is determined by a subsidiary start address, namely, the minimum address 163 and a subsidiary end address, namely, the maximum address 164 which are stored in the control information area 112a as A3 and A4.

A similar transfer operation is carried out in the second processor unit 30b. For this purpose, the primary saving area 117b of the memory unit 50b is defined by a primary start address 166 and a primary end address 167 while the subsidiary saving area 118b is defined by a subsidiary start address 168 and a subsidiary end address 169, as shown in FIG. 13.

It is possible for each information transfer units 51a'' and 51b'' to detect whether or not such saving areas are available by monitoring the acceptance signal SS written into each control information area 112a and 112b by each execution processor unit 31.

Herein, description will be mainly directed to the transfer operation of the first processor unit 30a for brevity of description.

In FIG. 13, let the first through the third information signals 151 to 153 be transferred as the first through the third copied information signals 151' to 153' into the primary saving area 117a. In this event, the first information transfer unit 51a'' detects whether or not the first through the third information signals 151 to 153 are certainly transferred to the primary saving area 117a by the use of the primary start address 161 and the primary end address 162 in the manner described before. If the first through the third information signals 161 to 163 are transferred outside of the primary saving area 117a, the first information transfer unit 51a'' does nothing at all and is stopped.

Otherwise, the first information transfer unit 51a'' extracts the first through the third information signals 161 to 163 from the bus line 35a when the information signals 161 to 163 are transferred to the primary saving area 117a. Subsequently, the first information transfer unit 51a'' further transfers the first through the third information signals 151 to 153 to the primary saving area 117b of the memory unit 50b on detecting that such information signals are to be transferred as first through third transferred information signals 151'' to 153'' to the primary saving area 117b defined by the primary start address 166 and the primary end address 167, when energized by the execution processor unit 31a.

Likewise, fourth and fifth information signals 171 and 172 stored in the subsidiary information area 114b of the memory unit 30b are transferred to the subsidiary saving area 118b of the memory unit 30b as fourth and fifth copied information signals 171' and 172' and to the subsidiary saving area 118a of the memory unit 30a as fourth and fifth transferred information signals 171'' and 172''.

Thus, the information signals renewed within each memory unit 50a and 50b are kept in the other memory unit as the transferred or saved information signals. Therefore, even when either one of the first and the second processor units 30a and 30b is faulty, the other processor unit can continue processing carried out in the faulty processor unit by the use of the saved information signals.

Operation will be described more in detail with reference to FIG. 14 also. At first, the execution processor unit 31a defines the primary and the subsidiary saving areas 117a and 118a. To this end, the primary start address 161, the primary end address 162, the subsidiary start address 163, and the subsidiary end address 164 are written as the first through the fourth area indication signals A1 to A4 into the control information area 112a at a first step S1. Thereafter, the acceptance signal SS is also written into the control information area 112a at a second step S2. When the first information transfer unit 51a'' detects the acceptance signal SS at a third step S3, the primary start address 161, the primary end address 162, the subsidiary start address 163, and the subsidiary and address 164 are read out of the control information area 112a and stored into the first through the fourth address registers 136a to 139a (FIG. 11) at a fourth step S4. Thereafter, the first information transfer unit 51a'' produces the reply signal RP at a fifth step S5 and thereby informs the first execution processor unit 31a of completion of processing. Thereafter, the first information transfer unit 51a'' is put into a standby state and waits for the following acceptance.

When the first execution processor unit 31a detects the reply signal RP and knows completion of processing at a sixth step S6, the first through the third renewed information signals 151 to 153 are produced at a seventh step S7 and monitors the status signal ST at an eighth step S8. The first execution processor unit 31a detects that the status signal ST is normal and that the information transfer unit 51a'' is consequently available. In this event, the first execution processor unit 31a produces the first through the third renewed information signals 151 to 153 and transfer the same to the primary saving area 117a as the first through the third copied information signals 151' to 153' at a ninth step S9. Such transfer operation is monitored through the bus line 35a by the first information transfer unit 51a''. When the transfer is detected at a tenth step S10, the first information transfer unit 51a'' judges whether or not the transfer is carried out within the primary saving area 117a at an eleventh step S11. When the information signals are transferred to the primary saving area 117a, the first information transfer unit 51a'' automatically extracts the first through the third renewed information signals 151 to 153 form the bus line 35a and transfers the same to the second information transfer unit 51b of the second processor unit 30b at a twelfth step S12. The transferred information signals are temporarily stored in the second information memory 133b of the second information transfer unit 51b'' at a thirteenth step S13.

On the other hand, when the first execution processing unit 31a of the first processor unit 30a completes transfer of the first through the third information signals 151 to 153 to the primary saving area 117a at a fourteenth step S14, the acceptance signal SS is written into the control information area 112a by the first execution processor unit 31a at a fifteenth step S15. The abovementioned write-in operation is detected by the first information transfer unit 51a'' at a sixteenth step S16. On detection of the acceptance signal SS, the first information transfer unit 51a'' produces and stores the reply signal RP into the control information area 112a at a seventeenth step S17.

When the reply signal RP is detected at an eighteenth step S18, the first execution processor unit 31a completes the processing in question and proceeds to the following processing, as shown at a nineteenth step S19. During the following processing of the first execution processor unit 31a, the first information transfer unit 51a'' supplies the second information transfer unit 51b'' with an indication of writing the transferred information signals stored in the information memory 133a, as shown at a twentieth step S20.

The second information transfer unit 51b'' detects that the transferred information signals are to be transferred within the primary saving area 117b determined by the primary start address 166 and the primary end address 167 at a twenty-first step S21. In other words, judgement of an area is made by the second information transfer unit 51b'' in the manner mentioned before. Thereafter, the transferred information signals are stored in the primary saving area 117b of the second memory unit 50b as the first through the third saved information signals 151'', 152'', and 153'', as shown at a twenty-second step S22.

When the information processor unit 30a detects completion of processing in the second information processor unit 30b at a twenty-third step S23, the status signal is produced by the first information processor unit 30a and stored in the control information area 112a at a twenty-fourth step S24. Thereafter, the operation is returned back to the tenth step S10 so as to wait for the following acceptance given by the first execution processor unit 31a.

Heretofore, it was generally necessary to prepare various kinds of monitoring information signals in addition to a control program which defines procedure for executing the input/output instruction.

According to the above-mentioned operation, no input/output instruction is executed in each information processor unit. Therefore, it is possible to process the transfer operation at a high speed.

While this invention has thus far been described in conjunction with a few embodiments thereof, it will readily be possible for those skilled in the art to put this invention into practice in various other manners. For example, more than two processor units may be included in the information processor system.

What is claimed is:

1. An information processing system comprising first and second processor units each of which comprises a bus line, a memory unit coupled to said bus line for storing a control program processed in each processor unit and a main data signal renewed periodically in accordance with the control program read out of said memory unit, an execution processor unit coupled to said bus line for carrying out processing in accordance with said control program, and an information transfer unit coupled to said bus line for transferring said main data signal to the other processor unit and for transferring, to said memory unit, an additional data signal sent from the other processor unit, said memory unit having a control program area for storing said control program, a data area for storing said main data signal, and a saving area for saving the main data signal of each processor unit and said additional data signal, said main data signal being transferred from said data area to said saving area on the basis of said control program under control of said execution processor unit with said main data signal kept in said data area;

said information transfer unit comprising:
bus control means coupled to said bus line for receiving said main data signal from said memory unit through said bus line when said main data signal is transferred from said data area to said saving area;
processing control means coupled to said bus control means for carrying out transfer control of the main data signal sent from said bus control means and said additional data signal sent from the other processor unit;
output transfer control means coupled to said processing control means for transferring the main data signal to the other processor unit under control of said processing control means; and
input transfer control means coupled to said processing control means and supplied with said additional data signal for transferring said additional data signal to said saving area through said bus line under control of said processing control means.

2. An information processing system as claimed in claim 1, wherein said memory unit further has a control information area for storing a status signal representative of status of said information transfer unit;
said execution processor unit executing the control program with reference to said status signal to transfer said main data signal to said saving area.

3. An information processing system as claimed in claim 2, wherein said control information area is loaded with a reply signal representative of a reply of said information transfer unit.

4. An information processing system as claimed in claim 1, said main and said additional data signals being accompanied by main and additional addresses, respectively, wherein said saving area has a first saving area for said main data signal and a second saving area for said additional data signal, said first saving area being defined by a first minimum address and a first maximum address while said second saving area is defined by a second minimum address and a second maximum address;
said memory unit having a control information area for storing said first and said second minimum and maximum addresses;
said bus interface means comprising:
address comparing means for comparing said main address with said first minimum and said first maximum addresses to detect whether or not said main data signal is transferred within said first saving area and to produce a result signal representative of a result of comparison; and
means for supplying said result signal to said processing control means to make said processing control means control said output transfer control means in accordance with said result signal.

5. An information processing system as claimed in claim 4, wherein said input transfer control means comprises:
storing means for storing said second minimum address and said second maximum address to send both the second minimum and the second maximum addresses to said address comparing means and to make said address comparing means compare said additional address with said second minimum and said second maximum addresses;
said address comparing means supplying said result signal to said processing control means to determine whether or not said additional data signal is transferred within said second saving area.

6. An information processing system comprising a plurality of processors which are connected to one another and which are structured so that, when a fault occurs in either one of the processors, the remaining one of the processors takes over and executes processing of the faulty processor so that a system operation is not wholly interrupted over the entire information processing system, each of said processors comprising:

a memory unit for storing a control program, a control information signal, and a table information signal;

an execution processor unit for executing the control program read out of said memory unit to process an operation in accordance with the control program and to renew the control information signal and the table information signal in said memory unit;

a bus for connecting said memory unit and said execution processor unit; and an information transfer unit coupled to the other processor through an output transmission path and an input transmission path;

said information transfer unit comprising:

bus control means for controlling a connection of said memory unit to said bus so as to extract said table information signal from said memory unit;

processing control means responsive to said table information signal for producing an indication signal necessary for transfer control of said table information signal;

output transfer control means responsive to said indication signal for carrying out interface control of said output transfer path;

input transfer control means responsive to said indication signal for carrying out interface control of said input transfer path; and information storage means for storing the table information signal sent from the other processor through said input transfer control means;

said plurality of processors being coupled through said information transfer unit to one another so that the table information signal of the memory unit of the one processor is preserved in the memory unit of the other processor.

* * * * *

UNITED STATES PATENT AND TRADEMARK OFFICE
CERTIFICATE OF CORRECTION

PATENT NO. : 5,202,980
DATED : April 13, 1993
INVENTOR(S) : Nobuki MORITA et al.

It is certified that error appears in the above-indentified patent and that said Letters Patent is hereby corrected as shown below:

Col. 1, line 51, delete "imformation" and insert --information--;

Col. 3, line 22, before "time", insert --time to--;

Col. 4, line 52, delete "ofbrevity" and insert --of brevity--.

Signed and Sealed this

Eighth Day of March, 1994

Attest:

BRUCE LEHMAN

Attesting Officer

Commissioner of Patents and Trademarks